May 22, 1956  A. T. RACE, JR., ET AL  2,746,772
PIPE GUIDING RIBBED APRON FOR IRRIGATION PIPE
Filed Oct. 2, 1953

INVENTORS
Austin T. Race, Jr. and
Norman C. Heck

BY Mason, Fenwick & Lawrence
ATTORNEYS

United States Patent Office 2,746,772
Patented May 22, 1956

2,746,772

PIPE GUIDING RIBBED APRON FOR IRRIGATION PIPE

Austin T. Race, Jr., and Norman C. Heck, Winter Haven, Fla., assignors to Race & Race, Inc., Winter Haven, Fla., a corporation of Florida Application October 2, 1953, Serial No. 383,722

2 Claims. (Cl. 285—1)

This invention relates to irrigation pipe of the automatic coupling type, and more particularly, to aproned couplers for such pipe and the aprons therefor.

Irrigation pipe which is portable and has automatic couplers has come into widespread use. Such pipe is usually provided in long lengths of from twenty to forty feet with a coupling member secured to one end and locking lugs fixed to the other end for connection to another section. The pipe is extremely light in weight, but due to its length it is usually handled at a mid-point and the operator inserts the lug end into the coupling of another section while standing ten to twenty feet from the coupling. Difficulty is encountered in inserting the pipe end in the coupling, and frequently the end of the pipe strikes the earth and soil is carried into the line.

Many couplers are provided with aprons extending beyond the end of the coupler and serving as a foot or stand to elevate the coupler above the ground level. These, however, do not solve the problems, mentioned above, incident to the coupling of sections of pipe.

The object of the present invention is to provide an aproned coupler, or an apron for a coupler, which not only serves to elevate the coupler, but to guide the pipe end into the coupler opening by providing a plurality of guiding surfaces upon which the pipe end may slide.

Another object of this invention is to provide such an apron which has means to support the end of the pipe to be inserted in the coupler, so that accumulated dirt in the pipe end may flow out before the pipe is coupled to prevent the dirt from getting into the line.

Still another object of the invention is to provide an apron of this character which can be manufactured readily and cheaply as a simple casting and can be made as a part of the coupler or as a separate part to be attached thereto.

Other objects of the invention will become apparent from the following description of one practical embodiment thereof, when taken in conjunction with the drawings which accompany, and form a part of, this specification.

Figure 1:
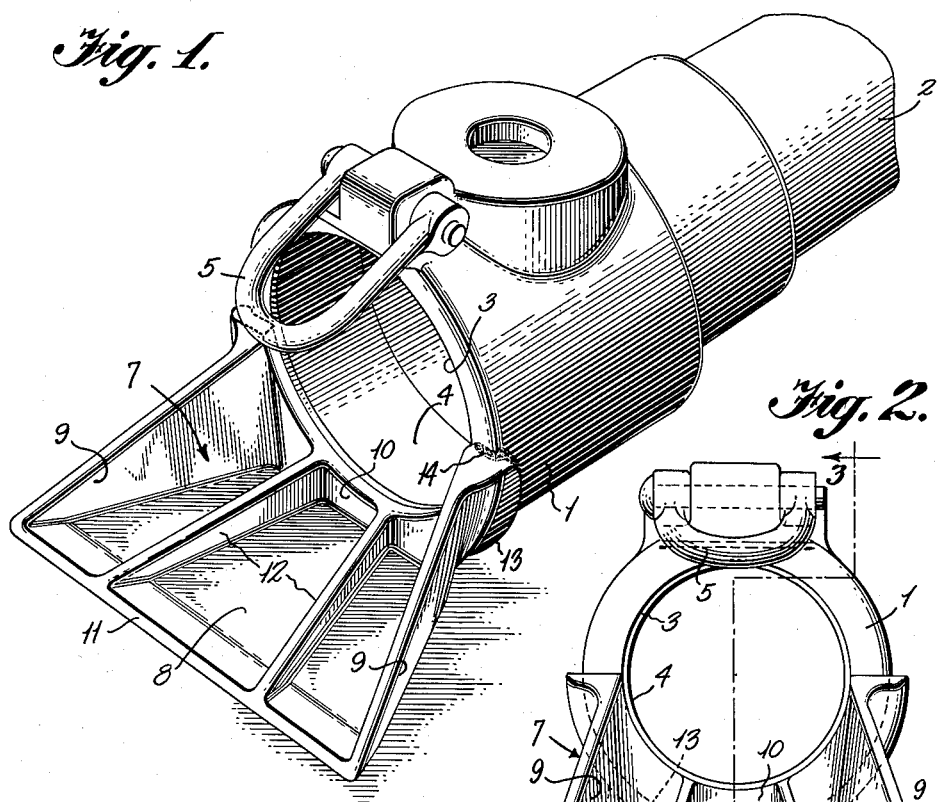
Fig. 1 is a perspective view of the end of a section of irrigation pipe with a coupler and apron embodying the principles of the present invention attached.
Figure 2:
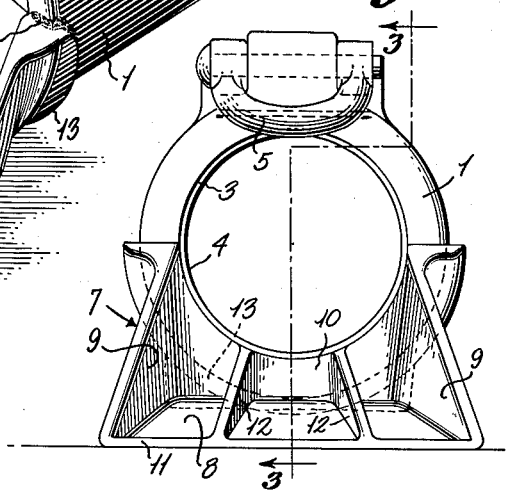
Fig. 2 is an end view of the structure shown in Fig. 1.

Referring to the drawings in detail, a coupler 1, of known type, is shown fixed to the end of a section of irrigation pipe 2. The coupler is a hollow cylindrical casting having an open mouth 3. It will be noted, particularly from Fig. 3, that the mouth is formed by an annular flange extending inwardly at right angles to the body of the cylindrical coupler. Within the mouth there is a rubber gasket 4 having a tapered flexible lip which engages around the end of the next section of pipe when inserted, and seals under the pressure in the line. At the top of the coupler at the mouth end, there is a boss to which is pivotally attached a locking link or bail 5. Link 5 rides over, and drops behind, a cam lug 6 on the end of the next section of pipe when that section is inserted into the coupler.

The apron 7, which is the particular feature with which the present application is concerned, may be cast integrally with the coupler, or made as a separate part and joined to the coupler. The apron is connected to the bottom of the coupler, about the lower portion of the mouth, and extends an appreciable distance beyond the end of the coupler. The apron flares outwardly to form an approach throat to the mouth of the coupler.

The apron is formed with a bottom 8, side walls 9, and back wall 10. The back wall is vertical, and has a flat bottom edge, upwardly diverging side edges and an arcuate upper edge to conform to and fit closely about the mouth of the coupler. The bottom joins the bottom edge of the back wall, and inclines downwardly to a point near its outer edge where it is formed into a lip 11 which lies parallel to the axis of the coupler. The bottom has outwardly flaring sides from which the side walls rise. The side walls are triangular in shape, their upper edges rising from the forward lip 11 to the upper arcuate edges of the back wall. As the side walls converge toward the mouth of the coupler, they serve as side guides to position the end of a pipe being inserted in the coupler in transverse alignment with the mouth of the coupler.

Two inclined ribs 12 extend upwardly from the bottom of the apron. The upper edges of the ribs rise from the forward edge of the lip to the arcuate edge of the back wall. The ribs also converge toward the mouth of the coupler so that they cooperate with the side walls in properly guiding a pipe end into place. The inclined top edges of the ribs function also as tracks, or skids, to elevate the pipe end being inserted into vertical alignment with the mouth of the coupler.

If the apron is made as a separate part, as shown, it will have an arcuate flange 13 projecting from the rear of the back wall. The flange will fit closely around the lower portion of the outer end of the coupler body. The flange may be welded, as at 14, to the coupler body for permanent attachment.

Figure 3:
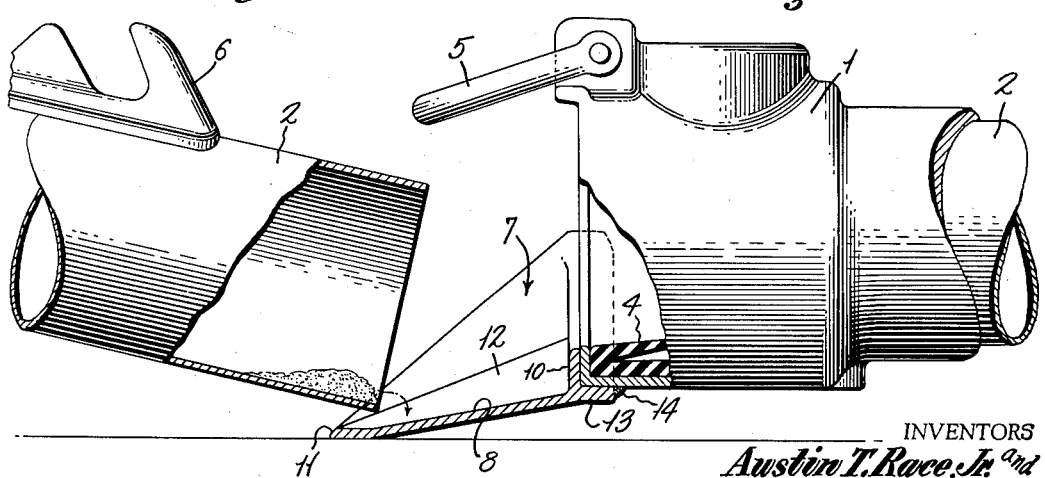
Fig. 3 is a view taken on the line 3—3 of Fig. 2, showing the pipe, coupler and apron with the end of an adjacent section of pipe being inserted in the coupler.

When two sections of pipe are to be joined, the operator will approach the coupler end of the section already connected to the line carrying the section to be coupled at a mid-point. He will lower the end to be inserted toward the coupler. As the coupler is close to the ground, and the operator some distance away, the pipe end frequently strikes, and digs into the ground in front of the coupler. Some dirt is bound to remain in the pipe end as it is lifted from the ground. When the pipe end strikes the apron it will be guided by the side walls 9 and ribs 12 into precise alignment with the mouth of the coupler. The pipe end will be inclined downwardly while moving into position, as shown in Fig. 3, and as it moves up the inclined ribs it is raised above the bottom of the apron. Thus, dirt which is loose in the pipe end, or jarred loose when striking the apron can pour out of the pipe end onto the inclined bottom of the apron, and roll down the apron bottom onto the ground. Therefore, the apron serves both to guide the pipe end into the mouth of the coupler and permit clearing of debris from the end prior to entrance into the coupler.

While in the above one practical embodiment of the invention has been described and shown, it will be understood that this is merely by way of example, and changes may be made from the precise details disclosed within the scope of the appended claims.

What is claimed is:

1. A pipe-guiding and pipe-clearing apron for irrigation pipe couplers having an open mouth to receive an end of a pipe section to be coupled thereto comprising, a transversely flat bottom having a coupler end adapted to be mounted adjacent the coupler spaced below the coupler mouth and an outer end spaced from the coupler mouth, said bottom being formed at an obtuse angle to the coupler mouth, the side edges of said bottom flaring from the coupler end outwardly, side walls rising from the side edges of said bottom, having their top edges flush with said bottom at the outer end thereof and increasing in height from said bottom to the coupler end, the inner side of said side walls having a portion substantially flush with said open mouth, and ribs extending the full length of said bottom, rising vertically from said bottom and having their top edges flush with said bottom at the outer end thereof and progressively increasing in height from said bottom to the coupler end to be substantially flush with said coupler mouth, said ribs being spaced from one another and from said side walls and diverging toward the outer end of said coupler with respect to each other and with respect to said side walls, said ribs and said inner sides of said side walls serving to guide a pipe end into said open mouth.

2. In an apron as claimed in claim 1, a back wall having a straight lower edge joined to said bottom and an arcuate upper edge to fit against said coupler mouth, and a rearwardly extending arcuate flange joined to said back wall in spaced relation to the arcuate edge of said back wall to fit around said coupler mouth and be attached thereto.

References Cited in the file of this patent

UNITED STATES PATENTS

| | | |
|---|---|---|
| 777,435 | Rylatt | Dec. 13, 1904 |
| 2,469,538 | Young | May 10, 1949 |
| 2,677,558 | Cornelius | May 4, 1954 |